July 29, 1958  B. D. PRIESTMAN  2,845,291
RETAINING CLIP AND ASSEMBLY
Filed Jan. 25, 1955
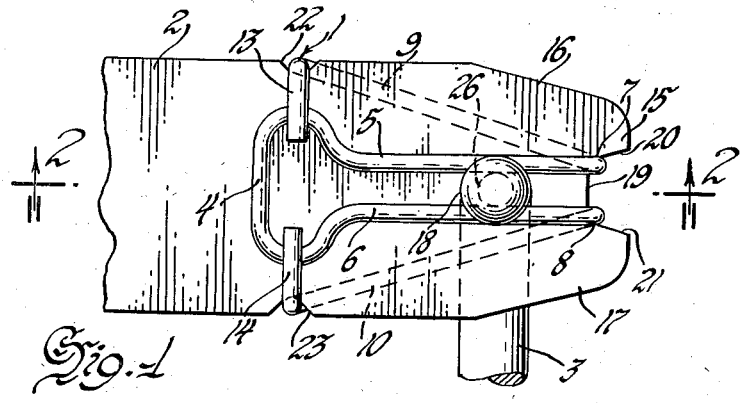
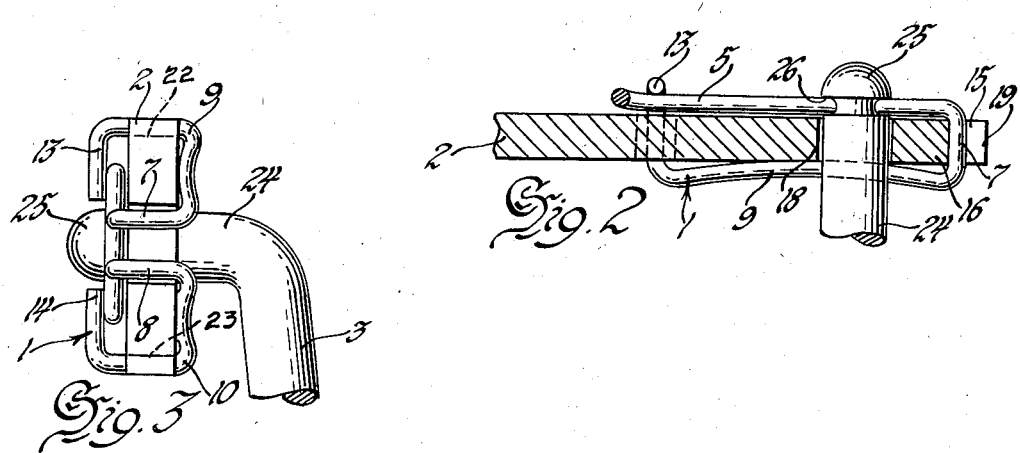
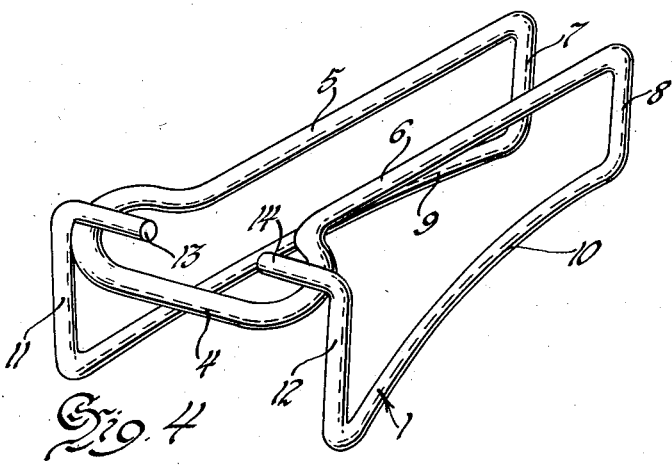
INVENTOR
Bewley D. Priestman
BY
S. E. Ross
ATTORNEY United States Patent Office 2,845,291
Patented July 29, 1958

2,845,291

RETAINING CLIP AND ASSEMBLY

Bewley D. Priestman, Livonia, Mich., assignor to General Motors Corporation, Detroit, Mich., a corporation of Delaware Application January 25, 1955, Serial No. 483,940

3 Claims. (Cl. 287—91)

This invention relates to retaining devices and more particularly to resilient wire clips for securing together plural parts of an assembly.

In many assembly operations it is required to connect together mating parts in places where the working space is restricted and access is limited. Under such conditions manipulation of the parts is difficult and time consuming. An example of this type of assembly is found in the manufacture of vehicles in assembling the latch operating linkages which are disposed within the vehicle door. In this example, it is necessary to pivotally connect an operating rod to the remote lever of the latch mechanism. These parts must be positively locked against separation and should be constrained against relative motion which would produce rattle and other undesired noises. Because of the inaccessability of these parts and the nature of the connection required, it is especially advantageous to provide for securing the parts together by a simple manipulation of only one of the parts.

Accordingly, it is an object of this invention to provide an improved wire retaining clip for plural parts which may be actuated by a simple thrusting motion of one of the parts to secure the parts together.

Another object is to provide a wire retaining clip of simple and inexpensive construction which positively locks assembled parts together while permitting relative motion therebetween.

Another object of this invention is to provide a retaining clip for securing a rod to a plate in such manner that pivotal motion is permitted while relative movement causing rattle or other undesired noises is restrained.

A further object is to provide a retaining clip for securing parts together which is constructed to accommodate itself to the dimensions of the parts and thereby minimize the effect of variations in size occurring in mass produced parts.

In carrying out this invention there is provided a clip of resilient wire having a bight portion which terminates in a first pair of spaced portions extending into respective return bend portions and thence into a second pair of spaced portions. A locking portion may be provided on each portion of the second pair and each locking portion may terminate in a stop portion which overlies the bight portion. The clip is adapted to be snapped over a plate member and secured thereto by the locking portions. One pair of spaced portions of the clip extends across an opening in the plate and another member is extended through the opening and secured in place by engagement with the pair of spaced portions.

A more complete understanding of the manner in which the foregoing objects are achieved by this invention may be had from the description which follows taken with the accompanying drawings in which:

Figure 1 is a view of the inventive clip and assembly.

Figure 2 is a sectional view taken on line 2—2 of Figure 1.

Figure 3 is a view of one end of the inventive assembly.

Figure 4 is a perspective view of the inventive retaining clip.

In the drawings there is shown an illustrative embodiment of the invention in which the clip, designated generally at 1, is mounted upon a plate member or lever 2 to which is pivotally connected a rod member 3 secured to the plate by the clip 1.

The clip 1 is formed of a single piece of resilient wire and comprises a bight or loop portion 4 terminating in spaced limbs or fastening portions 5 and 6. The bight 4 may be of any suitable configuration which permits resilient separation of the limbs 5 and 6 and in the preferred embodiment it is generally elliptical in shape. The spaced limbs 5 and 6, coplanar with the bight 4, are disposed in parallel relation and terminate in respective return bends or connecting portions 7 and 8. The return bends 7 and 8 extend into respective spaced limbs or clamping portions 9 and 10. The limbs 9 and 10 are disposed in lateral juxtaposition with the limbs 5 and 6 respectively, and extend divergently into respective locking portions 11 and 12. The limbs 9 and 10 are preferably bowed in an arcuate configuration toward the limbs 5 and 6 respectively, to provide a construction in which the two pairs of limbs are convergent throughout one part of their respective lengths and divergent throughout another part of their respective lengths. The locking portions 11 and 12 extend generally toward the bight 4 and are preferably parallel to the return bends 7 and 8. The locking portions 11 and 12 terminate in respective stop portions 13 and 14 which overlie the bight 4.

The plate 2 which is adapted to support the clip 1 is provided with a wedge-shaped end 15 having lateral edges 16 and 17 which are convergent toward the end 15. The plate 2 defines a centrally disposed opening 18 extending transversely therethrough. A recess 19 is provided in the end 15 of the plate 2 and is defined by convergent walls 20 and 21. Spaced from the end 15 of the plate 2 is disposed a pair of notches 22 and 23 in opposite edges of the plate 2.

In mounting the clip 1 upon the plate 2, the locking portions 11 and 12 are positioned opposite the edges 16 and 17 respectively, and the clip is advanced on the plate by a thrusting motion until the return bends 7 and 8 are seated in the recess 19. Thus, the locking portions 11 and 12 are spread by the wedging action of the edges 16 and 17 during the thrusting movement of the clip 1. The notches 22 and 23 are appropriately spaced from the end 15 of the plate 2 so that the locking portions 11 and 12 are resiliently seated in the notches 22 and 23 respectively, when the return bend portions 7 and 8 are seated in the recess 19. The clip 1 is then secured to the plate 2 by the gripping engagement of the locking portions 11 and 12. The plate 2 is also resiliently gripped between the fastening portions 5 and 6 and the clamping portions 9 and 10. This resilient gripping action assures close fitting engagement of the clip with the plate even though there are wide variations in the thickness of the plates with which the clip is used.

The rod member 3 which is pivotally mounted in the plate 2 is positively secured thereto by the clip 1 and is provided with a head portion 24 which terminates in a wedge-shaped end or rounded nose 25. The rod 3 is provided with an annular groove 26 adjacent the nose 25. In assembling the rod 3 and the plate 2 by use of the clip 1, the wedge-shaped end 25 is thrust through the opening 18 in the plate 2 until the limbs 5 and 6 snap over the nose 25 and move resiliently into the groove 26. When the rod 3 is thus inserted, the limbs 5 and 6 are spread by the wedging action of the nose 25 while displacement of the limbs 5 and 6 away from the plate 2 is prevented by the stop portions 13 and 14 which overlie the bight 4. Separation of the return bend portions 7 and 8 is prevented by their abutment with the walls 20 and 21 respectively, of the notch 19.

The many advantages as well as the versatility of the inventive retaining clip will now be recognized. The clip is of simple and inexpensive construction and is especially well adapted for use in assembly under conditions of limited space and access. Because of the gripping engagement of the clip with both parts of the assembly, rattling of the parts is prevented. The positive locking engagement of the clip with both parts prevents accidental separation of the parts from each other or from the clip.

Although this invention has been described with respect to a particular embodiment, this embodiment is illustrative only and is not to be construed in a limiting sense. Many modifications and variations within the function and scope of the invention will now occur to those skilled in the art. For a definition of the invention, reference is made to the appended claims.

I claim:

1. In combination, a plate having a wedge-shaped end and defining a central opening adjacent said end, said plate defining a pair of notches disposed in opposite edges thereof, a resilient wire clip comprising a loop portion terminating in a first pair of spaced portions extending across said opening to said end, said first pair of spaced portions terminating in respective connecting portions extending transversely of said plate, a second pair of spaced portions extending from said respective connecting portions, each of said second pair of spaced portions terminating in a transverse locking portion, said locking portions adapted to be spread by coaction with said wedge-shaped end and each being disposed in a different one of said notches, and a rod extending transversely of said plate through said opening and between the spaced portions of said first pair in frictional engagement therewith.

2. In combination, a resilient wire clip having a bight portion terminating in a first pair of spaced limbs, a pair of return bend portions extending from respective spaced limbs of said first pair and terminating in a second pair of spaced limbs, a pair of locking portions extending transversely of the respective spaced limbs of said second pair, a pair of stop portions extending from respective locking portions and overlying said bight portion, a plate terminating in a wedge-shaped end and defining a recess disposed centrally in said end, said plate defining a pair of notches disposed in opposite edges thereof and defining an opening therein, said wedge-shaped end being inserted between said first and said second pair of spaced limbs into abutment at said recess with said return bend portions whereby said locking portions are spread by the wedge-shaped end of said plate and are resiliently seated in said notches, a rod having a wedge-shaped end and defining an annular groove spaced from said end, said rod being inserted through said opening whereby the spaced limbs of said first pair are spread by the wedge-shaped end of said rod and are resiliently seated in said groove.

3. In combination, a resilient wire clip having a bight portion terminating in a pair of parallel spaced fastening portions, a pair of return bend portions extending from respective spaced fastening portions of said pair and terminating in a pair of divergently extending spaced clamping portions, said clamping portions being bowed in a direction toward said fastening portions, a pair of locking portions extending transversely from the respective spaced clamping portions, a pair of stop portions extending from respective locking portions and overlying said bight portion, a lever terminating in a wedge-shaped end and defining a recess having convergent walls in said end, said lever defining a pair of notches disposed in opposite edges thereof and defining a centrally disposed opening therein, said wedge-shaped end being inserted between said fastening and said clamping portions into abutment with said return bend portions at the convergent walls of said recess, whereby said locking portions are spread by the wedge-shaped end of said lever and resiliently seated in said notches, a rod having a wedge-shaped end and defining an annular groove adjacent said end, said rod being inserted through said opening whereby the said fastening portions are spread by the wedge-shaped end of said rod and are resiliently seated in said groove.

References Cited in the file of this patent

UNITED STATES PATENTS

| | | |
|---|---|---|
| 567,198 | Richardson | Sept. 8, 1896 |
| 1,062,764 | Buckley | May 27, 1913 |
| 1,223,181 | Kjeldaas | Apr. 17, 1917 |
| 2,313,249 | Lum | Mar. 9, 1943 |
| 2,744,734 | Schoen | May 8, 1956 |